(12) United States Patent
Leone et al.

(10) Patent No.: US 12,047,366 B2
(45) Date of Patent: Jul. 23, 2024

(54) COMMUNICATIONS SERVER AND USER DEVICE FOR VALIDATING A TOKEN

(71) Applicant: Sanofi, Paris (FR)

(72) Inventors: Milena Leone, Frankfurt am Main (DE); Gianluca Massimo Ferri, Frankfurt am Main (DE); Fabio Cappuccio, Frankfurt am Main (DE)

(73) Assignee: Sanofi, Paris (FR)

( * ) Notice: Subject to any disclaimer, the term of this patent is extended or adjusted under 35 U.S.C. 154(b) by 171 days.

(21) Appl. No.: 17/436,473

(22) PCT Filed: Mar. 5, 2020

(86) PCT No.: PCT/EP2020/055909
§ 371 (c)(1),
(2) Date: Sep. 3, 2021

(87) PCT Pub. No.: WO2020/178398
PCT Pub. Date: Sep. 10, 2020

(65) Prior Publication Data
US 2022/0086136 A1    Mar. 17, 2022

(30) Foreign Application Priority Data
Mar. 6, 2019   (EP) .................................. 19161152

(51) Int. Cl.
*H04L 29/06*     (2006.01)
*G06Q 30/02*     (2023.01)
(Continued)

(52) U.S. Cl.
CPC ..... *H04L 63/0807* (2013.01); *G06Q 30/0225* (2013.01)

(58) Field of Classification Search
CPC ..................... H04L 63/0807; G06Q 30/0225
See application file for complete search history.

(56) References Cited

U.S. PATENT DOCUMENTS 7,457,627 B2 * 11/2008 Knaebchen ........... H04L 47/781
                                                   455/406
7,580,864 B2    8/2009 Ahn
(Continued)

FOREIGN PATENT DOCUMENTS

CN       101650816       2/2010
CN       101657784       2/2010
(Continued)

OTHER PUBLICATIONS

International Preliminary Report on Patentability in International Application No. PCT/EP2020/055909, dated Aug. 25, 2021, 6 pages.
(Continued)

*Primary Examiner* — Yonas A Bayou
(74) *Attorney, Agent, or Firm* — Fish & Richardson P.C.

(57) ABSTRACT

A communications server for validating a token on a user device, the communications server comprising a memory storing: a list of locations; a first unique code associated with each location; a second unique code associated with each location; a user device product threshold; and a number of previously validated tokens for the user device, wherein the communications server is configured to: receive a first communication from the user device specifying the first unique code associated with a particular location; compare the number of previously validated tokens for the user device against the user device product threshold; when the number of previously validated tokens for the user device does not exceed the user device product threshold, send a reservation message to the user device, the reservation message causing the token on the user device to be reserved for use at the particular location; receive a second communication from the user device, the second communication specifying the second unique code associated with the particular location; and in response to receiving the second
(Continued)

unique code associated with the particular location, send a validation message to the user device, the validation message causing the token on the user device to be validated.

15 Claims, 6 Drawing Sheets

(51) Int. Cl.
*G06Q 30/0207* (2023.01)
*H04L 9/40* (2022.01)

(56) References Cited

U.S. PATENT DOCUMENTS

| | | | | |
|---|---|---|---|---|
| 7,961,715 | B1* | 6/2011 | Dhesikan | H04L 47/724 370/395.2 |
| 8,122,482 | B2* | 2/2012 | McGrew | H04L 63/0263 713/153 |
| 11,151,595 | B1* | 10/2021 | Maheswari | G06Q 30/0235 |
| 2002/0138346 | A1 | 9/2002 | Kodaka et al. | |
| 2004/0142697 | A1* | 7/2004 | Knaebchen | H04L 47/822 455/410 |
| 2009/0193506 | A1* | 7/2009 | McGrew | H04L 63/0263 726/6 |
| 2011/0302018 | A1* | 12/2011 | Norcross | G06Q 30/0225 705/14.26 |
| 2011/0313836 | A1 | 12/2011 | Walsh | |
| 2015/0271155 | A1* | 9/2015 | Ronca | H04L 63/0876 713/168 |
| 2016/0364790 | A1* | 12/2016 | Lanpher | H04L 63/107 |
| 2018/0018671 | A1 | 1/2018 | Celia | |

FOREIGN PATENT DOCUMENTS

| | | |
|---|---|---|
| CN | 102496121 A | 6/2012 |
| CN | 102625941 A | 8/2012 |
| CN | 105103179 | 11/2015 |
| CN | 108492133 A | 9/2018 |
| EP | 1164529 | 12/2001 |
| JP | 2002-279274 A | 9/2002 |
| JP | 2003-108897 A | 4/2003 |
| JP | 2014-197371 A | 10/2014 |
| JP | 2015-052964 A | 3/2015 |
| WO | WO 2008/083105 | 7/2008 |
| WO | WO 2010/065896 A1 | 6/2010 |
| WO | WO 2014/076684 | 5/2014 |
| WO | WO 2020/178398 | 9/2020 |

OTHER PUBLICATIONS

International Search Report and Written Opinion in International Application No. PCT/EP2020/055909, dated Apr. 4, 2020, 8 pages.

* cited by examiner

COMMUNICATIONS SERVER AND USER DEVICE FOR VALIDATING A TOKEN

CROSS REFERENCE TO RELATED APPLICATIONS

The present application is the national stage entry of International Patent Application No. PCT/EP2020/055909, filed on Mar. 5, 2020, and claims priority to Application No. EP 19161152.4, filed on Mar. 6, 2019, the disclosures of which are incorporated herein by reference.

TECHNICAL FIELD

The present disclosure relates to a communications server for validating a token on a user device and a user device for creating and validating the token, via the exchange of codes unique to a particular location between the user device and communications server.

BACKGROUND

In the field of product supply management, a supplier may need to dynamically manage a large number of different retail agreements with different retailers. The supplier may wish to offer each retailer flexibility regarding the retail price of particular products and the ability to apply limited term discounts to those products. The supplier may also wish to set a limit on the number of products which can be sold at a discount by each retailer and the number of products which can be bought at a discount by an individual consumer.

Where the supplier has to interact with many thousands of individual retail outlets, the complexity of introducing and managing a discount on even a single product can be very high. Furthermore, providing a discount for a product introduces the possibility of abuse/fraud on the part of the retailer and/or the consumer. There is therefore a need to provide a system which allows efficient monitoring of discounted products at the individual retailer and consumer level, whilst maintaining a high level of security and control for the supplier, in order to reduce the possibility of abusive/fraudulent use of the discount.

SUMMARY

A first aspect of the disclosure provides a communications server for validating a token on a user device, the communications server comprising: a memory storing: a list of locations; a first unique code associated with each location in the list of locations; a second unique code associated with each location in the list of locations; a user device product threshold; and a number of previously validated tokens for the user device, wherein the communications server is configured to: receive a first communication from the user device, the first communication specifying the first unique code associated with a particular location; compare the number of previously validated tokens for the user device against the user device product threshold; when the number of previously validated tokens for the user device does not exceed the user device product threshold, send a reservation message to the user device, the reservation message causing the token on the user device to be reserved for use at the particular location; receive a second communication from the user device, the second communication specifying the second unique code associated with the particular location; and in response to receiving the second unique code associated with the particular location, send a validation message to the user device, the validation message causing the token on the user device to be validated.

Requiring two separate unique codes to be received and matched against corresponding stored codes improves the security of the system and reduces the opportunity for abusive or fraudulent use of the tokens by both the user device and the retailer. The communications server performs a two step verification process, in which a check against the user device product threshold is performed before the user device is granted access to the second unique code via the sending of the reservation message. Storing the user device product threshold on the communications server allows the operator of the communications server to control and dynamically alter how many tokens each user is able to validate.

After sending the validation message, the communications server increases the stored number of previously validated tokens for the user device by one.

The memory may further store an expiry date and the communications server may be configured to compare a current date against the expiry date and to send the reservation message to the user device only when the current date is not later than the expiry date. This allows the operator of the communications server to control the duration of any product discount and to dynamically alter the expiry date without needing to communicate with any individual retailers.

The memory may further store a location product threshold and a number of previously validated tokens for each location in the list of locations and the communications server may be configured to compare a number of previously validated tokens for the particular location against the location product threshold and to send the reservation message to the user device only when the number of previously validated tokens for the particular location does not exceed the location product threshold.

Setting a limit on the number of tokens which can be used at each location further reduces the opportunity for abusive or fraudulent use of the token system by retailers.

The communications server may be further configured, when the number of previously validated tokens for the particular location exceeds the location product threshold, to send a rejection message to the user device, the rejection message causing the user device to indicate that the maximum number of tokens for the particular location have been validated. This allows the user to be informed of the reason for the rejection and potentially to travel to a different retail location to obtain the product at a discount. After sending the validation message, the communications server increases the stored number of previously validated tokens for the particular location by one.

The communications server maybe further configured, when the number of previously validated tokens for the user device exceeds the user device product threshold, to send a rejection message to the user device, the rejection message causing the user device to indicate that the maximum number of tokens for the user device have been validated.

The memory may further store a user device product per location threshold and a number of previously validated tokens for the user device per location and wherein the communications server is configured to compare a number of previously validated tokens for the user device per location against the user device product per location threshold and to send the reservation message to the user device only when the number of previously validated tokens for the user device per location does not exceed the user device product per location threshold.

This allows the user to be informed of the reason for the rejection and potentially to travel to a different retail location to obtain the product at a discount.

The first communication from the user device or the second communication from the user device may also specify a discount applicable to the product. The memory further stores a number of tokens for the user device which have been reserved, but not yet validated. The communications server maybe configured to send the reservation message to the user device only when the number of previously validated tokens for the user device plus the number of tokens for the user device which have been reserved, but not yet validated does not exceed the user device product threshold. Since validating the token is a two-step process, the user device may reserve one or more tokens without immediately proceeding to validate them. Comparing the total number of tokens which have been both reserved and validated against the user device product threshold ensures that a user device does not reserve a token which cannot subsequently be validated.

The communications server is maybe further configured, in response to sending the validation message to the user device, to send an email to an address associated with the particular location, the email confirming that a token has been validated. This creates a record of the token validation for the particular location and further reduces the opportunity for accounting errors or fraud.

The first communication from the user device may also specifies a product code. The operator the communications server may wish to offer discounts on several products simultaneously. Rather than storing two unique codes for each product-location combination, the communications server may only store the first and second codes unique to the location and the user device may specify the product when sending the first communication.

Alternatively, the communications server maybe configured to access a database and to map the first unique code to a particular product using information in the database. In this case, each product-location combination is represented by a unique first code. The mapping of the unique first code to a particular product is stored in an external database accessible by the communication server. This allows the external database to be updated independently of the communications server. The external database may for example be a wider company database storing product details.

A second aspect of the disclosure provides a method for validating a token on a user device, the method performed by a communications server comprising a memory storing: a list of locations; a first unique code associated with each location in the list of locations; a second unique code associated with each location in the list of locations; a user device product threshold; and a number of previously validated tokens for the user device, the method comprising: receiving a first communication from the user device, the first communication specifying the first unique code associated with a particular location and a product code; comparing the number of previously validated tokens for the user device against the user device product threshold; when the number of previously validated tokens for the user device does not exceed the user device product threshold, sending a reservation message to the user device, the reservation message causing the token on the user device to be reserved for use at the particular location; receiving a second communication from the user device, the second communication specifying the second unique code associated with the particular location; and in response to receiving the second unique code associated with the particular location, sending a validation message to the user device, the validation message causing the token on the user device to be validated.

A third aspect of the disclosure provides a user device for creating and validating a token, the user device comprising: a processor; a memory; and a wireless transceiver, wherein the user device is configured to: receive a first unique code associated with a particular location; in response to receiving the first unique code, generate the token and send a first communication comprising the first unique code to a communications server; receive a reservation message from the communications server; in response to receiving the reservation message, reserve the token for use at the particular location; receive a second unique code associated with a particular location; in response to receiving the second unique code, send a second communication comprising the second unique code to the communications server; receive a validation message from the communications server; and in response to receiving the validation message, validate the token.

Configuring the user device two validated the token using two unique codes improves the security of the system and reduces the opportunity for abusive or fraudulent use of the tokens by both the user device and the retailer. The token created by the user device requires a two factor authentication process in order to be validated. The user device must receive a reservation message from the communications server before the second unique code can be input.

In addition, no information needs to be exchanged between either the communication server and retailer system although user device and retailer system. This places control of the token validation process with the operator of the communications server. As well as improved security and reduced opportunity for fraudulent behaviour, this fact improves the flexibility and dynamic responsiveness of the product discounting arrangement. The operator the communications server can set limits on the number of discounted products each user can acquire, the number of discounted products each retail location sell, the number of discounted products each user can acquire at each location and the duration of the product discount. The operator the communications server can alter these limits dynamically without needing to communicate with each individual retail location.

Furthermore, it may be desirable to apply different discount levels for different retail locations, or to alter the discount level at some point during the discount period. The features of the communications server described above allow this to be achieved efficiently and with a minimum of signalling between the server and other systems.

A fourth aspect of the disclosure provides a method for creating and validating a token, the method performed by a user device comprising: a processor; a memory; and a wireless transceiver, wherein the method comprises the user device: receiving a first unique code associated with a particular location; in response to receiving the first unique code, generating the token and sending a first communication comprising the first unique code to a communications server; receiving a reservation message from the communications server; in response to receiving the reservation message, reserving the token for use at the particular location; receiving a second unique code associated with a particular location; in response to receiving the second unique code, sending a second communication comprising the second unique code to the communications server; receiving a validation message from the communications server; and in response to receiving the validation message, validating the token.

DETAILED DESCRIPTION

Figure 1:
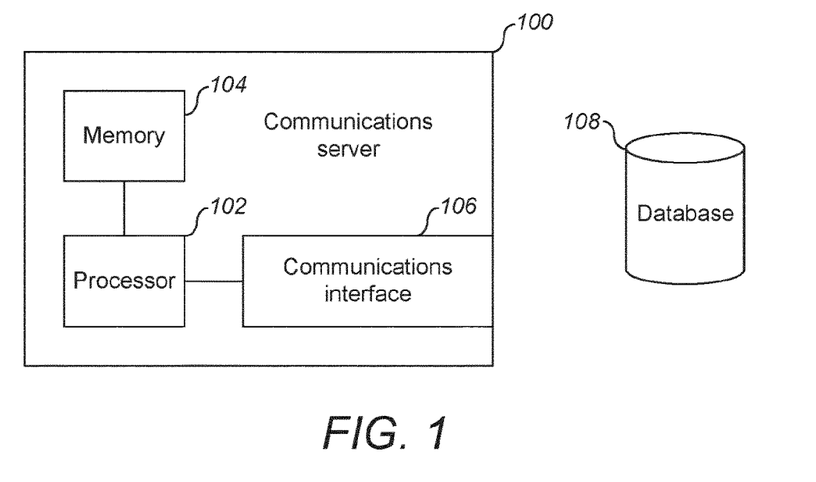
FIG. 1 is a schematic illustration of a communications server according to some embodiments.

FIG. 1 is a schematic illustration of a communications server 100 comprising a processor 102, a memory 104 and a communications interface 106. The processor 102 may for instance be a microprocessor, a Digital Signal Processor (DSP), Application Specific Integrated Circuit (ASIC), Field Programmable Gate Array (FPGA) or the like.

The memory 104 may comprise both a program memory storing program code (e.g. software or firmware) and main memory storing data. The processor 102 is configured to execute the program code stored in the program memory and to read, write and delete data from the main memory. The program memory may for instance be a Read-Only Memory (ROM), and the main memory may for instance be a Random Access Memory (RAM).

The communications interface 106 may be a wired or wireless interface. Alternatively the communications server 100 may comprise multiple communication interfaces of the same or different types.

A database 108 may also be provided. The database 108 may store tables mapping the unique codes associated with locations to particular products and discounts applicable to those products. In some embodiments the database 108 is remote from the communications server 100 and the communications server is configured to consult the database via its communications interface 106. In some other embodiments, the database 108 is integral with the communications server 100 and is provided for example as a separate memory unit or part of the memory 104. In some embodiments the communications server 100 can read information in the database 108, but cannot modify it.

In operation the communications server 100 receives communications from user devices. The processor 102, under control by the program code, then checks the information contained in the communications against that stored in the memory 104 and creates and sends reply messages to the user devices, as described in greater detail below. The processor 102 may then update the information stored in the memory.

Figure 2:
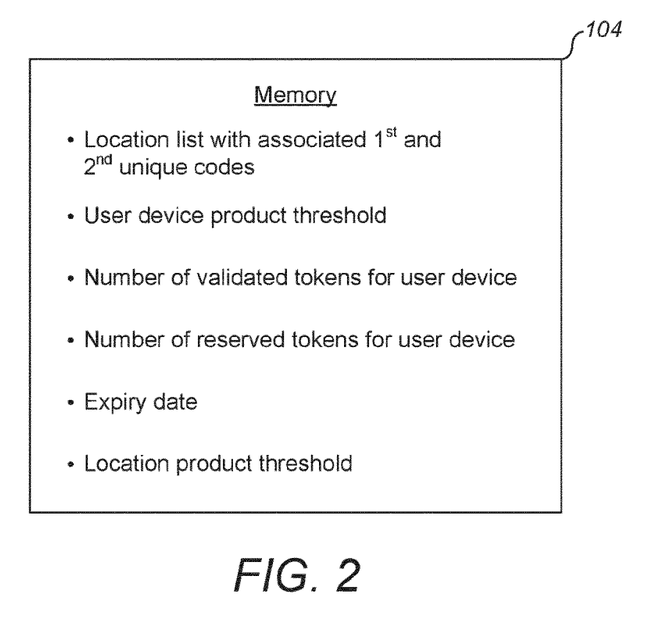
FIG. 2 illustrates the memory of the communications server of FIG. 1 and an exemplary list of data entries which are stored in the memory.

FIG. 2 illustrates the memory 104 and an exemplary list of data entries which may be stored in the memory. In this embodiment the memory stores a location list. The location list may be embodied as simple alphanumeric codes, or may comprise the name, physical location and/or address of the retail outlet. Each location in the list has an associated first unique code associated second unique code. Memory 104 also stores a user device product threshold. This threshold number represents the maximum number of products which can be obtained at a discount for each user device.

The memory 104 also stores a tally of the number of validated tokens for each registered user device and a tally of the number of tokens which are reserved for each user device, but which have not yet been validated. The memory also stores an expiry date applicable to the product discount.

The memory 104 further stores a location product threshold. The location product threshold represents the maximum number of products which can be sold at a discount for each location in the location list.

The data entries illustrated in the memory 104 may relate to a specific product and discount combination and the memory may store separate lists of data entries for each product and discount combination.

The communications server 100 is under the control of the supplier of the product(s), which allows the supplier to monitor all instances of use of the product discount without needing to consult the retailer. Control of the communications server also allows the supplier to set and dynamically update the expiry date of the discount, the number of discounted products available to each user and to each retail location and the number of discounted products available to each user per location. As mentioned above, the communications server 100 may also have access to a database 108 storing information which does not need to be updated, or which should not be updatable by the server 100 all. For example, the database 108 may be a larger supplier database storing information about the supplier's retail partners and product lists.

Requiring two separate unique codes to be received and matched against corresponding stored codes improves the security of the system and reduces the opportunity for abusive or fraudulent use of the tokens by both the user device and the retailer. The communications server performs a two-step verification process, in which a check against the user device product threshold is performed before the user device is granted access to the second unique code via the sending of the reservation message. Storing the user device product threshold on the communications server allows the operator of the communications server to control and dynamically alter how many tokens each user is able to validate.

Figure 3:
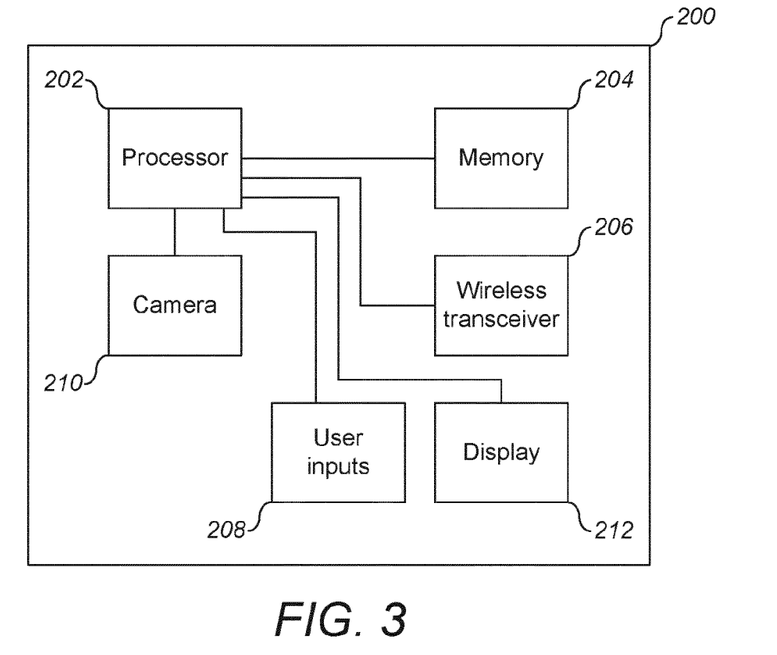
FIG. 3 is a schematic illustration of a user device according to some embodiments.

FIG. 3 is a schematic illustration of a user device 200 comprising a processor 202, a memory 204, a wireless transceiver 206, user inputs 208, a display 212 and optionally a camera 210. In some embodiments the user device 200 is a smart phone or tablet computer. The processor 202 may for instance be a microprocessor, a Digital Signal Processor (DSP), Application Specific Integrated Circuit (ASIC), Field Programmable Gate Array (FPGA) or the like.

The memory 204 may comprise both a program memory storing program code (e.g. software or firmware) and main memory storing data. The processor 202 is configured to execute the program code stored in the program memory and to read, write and delete data from the main memory. In some embodiments, the program code may be an application which can be downloaded and installed the user device 200. The program memory may for instance be a Read-Only Memory (ROM), and the main memory may for instance be a Random Access Memory (RAM).

The wireless transceiver 206 may be a cellular network interface. The user device 200 may also communicate over a WLAN, or by using any other suitable wireless protocol. The user device 200 may comprise multiple network interfaces and may use any of these to exchange data with the communications server 100.

The user device 200 comprises one or more user inputs 208, for example a touchscreen, keypad or keyboard, accelerometer or gyroscope, mouse or microphone for receiving voice commands. User device 200 may optionally also comprise a camera 210 configured to capture images of encoded information.

Figure 4:
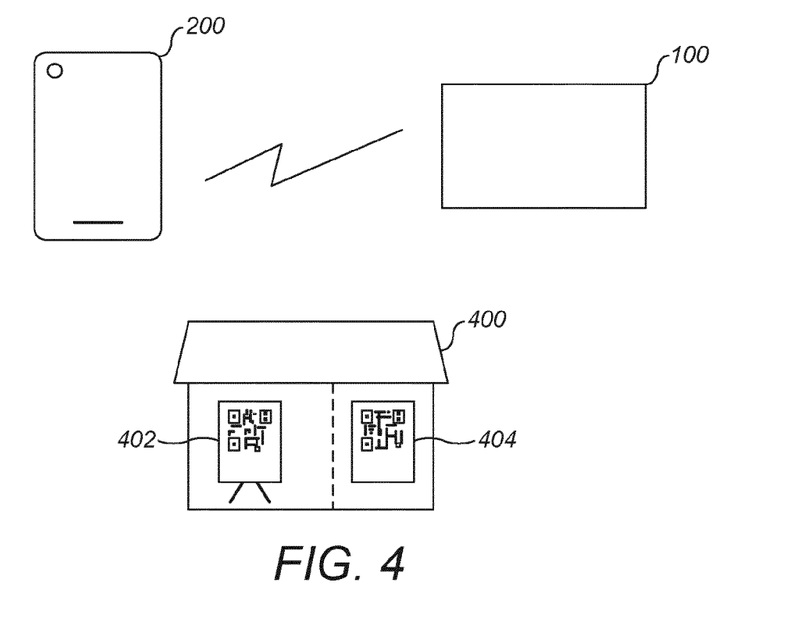
FIG. 4 is a simplified system diagram illustrating the communications server of FIG. 1, the user device of FIG. 3 and an exemplary retail location.

FIG. 4 is a simplified system diagram illustrating the communications server 100 of FIG. 1, the user device 200 of FIG. 3 and an exemplary retail location 400. Details of the network or networks over which the communications server and user device communicate are omitted. In the embodiment shown, the retailer does not need to communicate electronically with either the communications server 100 or the user device 200.

The exemplary retail location 400 has a first unique code 402 which is specific to that location. In some embodiments the first unique code 402 is displayed at the location. The first unique code 402 may take the form of a QR code, alphanumeric code, URL, or any other suitable encoded information. Where the first unique code 402 is a QR code, a user may activate the camera 210 of the user device 200 to capture an image of the QR code and to receive the first unique code. Alternatively, the user inputs 208 may be controlled to enter the alphanumeric code or URL in order to allow the user device 200 to receive the first unique code. It will also be appreciated that the first unique code may additionally be displayed at locations away from the retail location 400 and that the user may travel to the retail location 400 having already acquired the first unique code. User device 200 is configured to generate a token upon receipt of the first unique code.

The exemplary retail location 400 also has a second unique code 404 which is specific to that location. The second unique code 404 may not be on general display at the retail location 400 but may be shown to the user when certain preconditions are met. In general, the second unique code 404 is only obtainable directly from the retailer after the user device 200 has reserve the token. The second unique code 404 may also take the form of a QR code, alphanumeric code or any other suitable encoded information to be captured by the camera 210 of user device 200 or entered via the user inputs 208.

Figure 5:
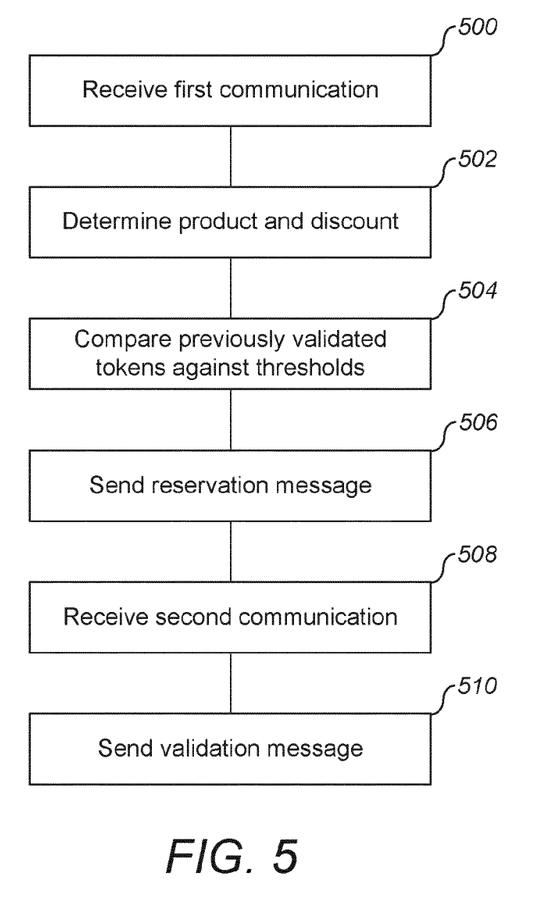
FIG. 5 is a flowchart illustrating exemplary operation of the communications server of FIG. 1.

Exemplary operation of the communications server 100 will now be described with reference to the flowchart of FIG. 5. The process begins at step 500 with the communications server receiving a first communication from a user device. The first communication at least specifies the first unique code associated with a particular location. The communications server 100 can also determine from the first communication an identity of the user device. The first communication may optionally also specify a product or product code. The first communication may optionally also specify a product discount. The communications server 100 checks that the first unique code is included in the list of codes stored in the memory 104 and determines the location associated with first unique code.

At step 502, the communications server 100 determines the product and the product discount. Where information concerning the product and the product discount was included in the first communication from the user device, this information is extracted from the first communication. In some other embodiments, the first unique code is also unique to a particular product and optionally an associated product discount, such that no further look-up is required. In yet further embodiments, the communications server consults the database 108 to map the first unique code to a particular product and product discount.

At step 504, the communications server 100 compares the number of previously validated tokens for the user device against a stored user device product threshold. The user device product threshold represents a maximum number products that any one user is permitted to obtain using the product discount. At this point, the communications server 100 may also check whether a location product threshold has been set. If a location product threshold has been set, the communications server compares the number of previously validated tokens for the location against the location product threshold. The location product threshold represents a maximum number products that any one retail location is permitted to sell using the product discount. At this point, the communications server may also check whether a user device product per location threshold has been set for the location indicated by the first unique code. The user device product per location threshold represents a maximum number of products that any one user is permitted to obtain the particular location. If such a threshold has been set, the communications server compares the number of previously validated tokens for the user device at the location indicated by the first unique code with this threshold. At this point, the communications server 100 may also check whether an expiry date for the product discount has been set. If an expiry date has been set, the communications server compares the current date against the expiry date.

When the number of previously validated tokens for the user device does not exceed the user device product threshold, at step 506 the communications server 100 sends a reservation message to the user device. The reservation message is configured to cause the token generated on the user device to be reserved for use at the particular location. Where the communications server has also compared the number of previously validated tokens for the location against a location product threshold, the reservation message is only sent when the number of previously validated tokens for the particular location does not exceed the location product threshold. Where the communications server has also compared the number of previously validated tokens for the user device at the location indicated by the first unique code with the corresponding threshold, the reservation message is only sent when that threshold is not exceeded. Where the communications server has also compared the current date against the expiry date, the reservation message is only sent when the current date is not later than the expiry date.

If any of the comparisons described above result in are threshold or expiry dates being exceeded then the reservation message is not sent and the communications server instead sends a rejection message which optionally contains details on the reason for the rejection, e.g. the user's token threshold has been reached, the location's token threshold has been reached, the user's token threshold for a particular location has been reached or the product discount period has expired.

Having sent the reservation message in step 506, the communications server receives a second communication from the user device in step 508. The second communication at least specifies a second unique code associated with the particular location. The second communication may optionally also identify a discount applicable to the product. Alternatively, the first unique code may be specific to both the product and the product discount, as well as a retail location. The communications server 100 checks that the second unique code is included in the list of codes stored in the memory 104 and also that the second unique code corresponds with the first unique code, i.e. that the first and second codes are associated with the same location and the same product.

Having confirmed that the first and second codes are associated with the same location and the same product, in step 510 the communications server 100 sends a validation message to the user device. The validation message is configured to cause the token generated on the user device to be validated for use at the particular location.

The communications server 100 may then increase the stored number of previously validated tokens for both the user device and the location by one. The communication server may also increase the stored number of previously validated tokens for the user device at the particular location represented by the first unique code by one. The communications server 100 may optionally then perform a further comparison of the stored number of previously validated tokens for both the user device and the particular location against the corresponding thresholds and inform the relevant party if the threshold has been met. The communications server 100 may also send an email or other electronic message to an address or number associated with the particular location indicating that a product discount token has been used at the location.

The various thresholds described above may be set at any limit deemed appropriate by the supplier of the product. One particular example, the user device product threshold may be set at ten, the location product threshold may be set at one hundred, and the user device product per location threshold may be set at two. This means that each user is able to acquire ten products at the discounted price, but may only acquire two of such products in any one location.

Figure 6:
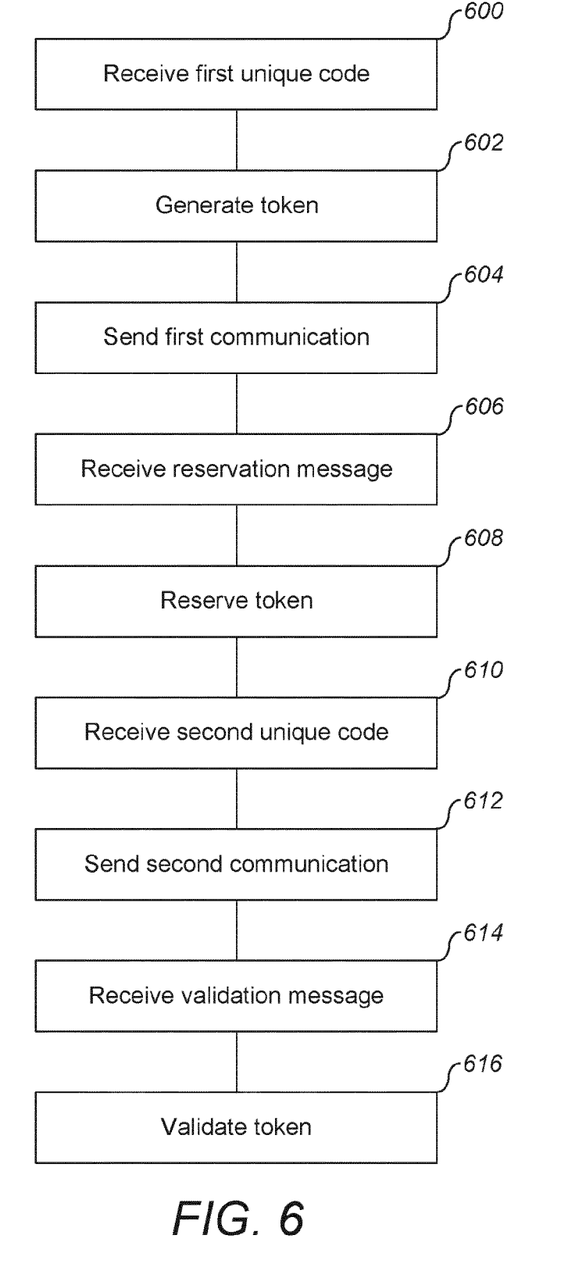
FIG. 6 is a flowchart illustrating exemplary operation of the user device of FIG. 3.

Exemplary operation of the user device 200 will now be described with reference to FIG. 6. The process begins at step 600 with the user device 200 receiving a first unique code. Having obtained the first unique code, the user device generates a token at step 602. The user device may obtain the first unique code in a number of different ways. For example the first unique code may be an alphanumeric code displayed at the particular location or at some other location and the user may manually enter the alphanumeric code into the user device 200 using user inputs 208. The user device 200 may store a dedicated application related to the token and the user may run this application to be presented with a box for entering the alphanumeric code. Alternatively or in addition the application may allow the user to activate the camera 210 of the user device to capture an image of encoded information displayed at the particular location or at some other location. For example the encoded information may be a QR code.

In some other embodiments, the application may be configured to track the location of the user device and when the user device enters the proximity of the particular location, to display a notification on the display 212 that a token is available. In this scenario, the display notification may inform the user that the first unique code is on display at their location. Alternatively, the communications server may be configured to send the first unique code directly to the user device upon being informed that the user device has entered the proximity of the particular location.

In some other embodiments, the communications server 100 may send a message to the user device, the message containing the first unique code of a particular location. The particular location may be based on the location of the user's home as indicated in their registration, or based on their tracked location history. The timing of this message may be controlled by the operator of the communications server 100 and may be unrelated to the user's location. The user may then enter the first unique code from the message into the application to generate the token.

Whatever the method by which the first unique code is obtained, at step 602 the user device generates a token. Initially the token may be in an unreserved state. At step 604 the user device 200 sends a first communication to the communications server 100. This step may occur as a consequence of receiving the first unique code and without any further user input. The first communication comprises the first unique code itself. An identity of the user device may be included in the first communication, either in the header or the data packet. The first communication may optionally also specify a product or product code. The first communication may optionally also specify a product discount.

Once the communications server 100 has performed the requisite checks described above with reference to FIG. 5, the user device 200 receives a reservation message from the communications server in step 606. Receipt of the reservation message causes the token to be reserved in step 608. The application may display a notification to the user on display 212 that the token has been reserved for use in the particular location. Alternatively or in addition the appearance of the already displayed token may change as a result of the token reservation.

At step 610, the user device 200 receives a second unique code. The second unique code may be obtained in the same manner as the first unique code, as described above. In a particular use case scenario, the second unique code is not on display at the particular location, but is obtainable from the retailer on request. In this scenario, the user may show the retailer the reserved token displayed on the user device 200 and the retailer may then reveal the second unique code. The user then enters the second unique code into the application via user inputs 208 or camera 210.

Upon obtaining the second unique code, the user device 200 sends a second communication to the communications server 100 in step 612. The second communication comprises at least the second unique code, but may also include the discount applicable to the product, where this is not already been communicated or is not available to a communications server 100.

In step 614, the user device 200 receives a validation message from the communications server 100. Receipt of the validation message in step 614 causes the token to be validated in step 616. The user may show the retailer the validated token displayed on the user device 200 to obtain the associated product with the discount applied.

Since validating the token is a two-step process, the user device may reserve one or more tokens without immediately proceeding to validate them. For example, s user may choose to reserve the token while in a particular retail location without purchasing the product in question and to return at a later date to validate the token and purchase the product. Some of the embodiments described above, the user device 200 may also receive the first unique code via a message directly from the communications server 100, in which case the user would need to travel to the location indicated by the token at a later time in order to validate and use the token. Comparing the total number of tokens which have been both reserved and validated against the user device product threshold ensures that a user device does not reserve a token which cannot subsequently be validated.

In a particular use case scenario, the locations in the location list are pharmacies. The products may be medication some other consumer products available through the pharmacies. In certain jurisdictions, such as Italy, pharmacies generally operate as individual businesses (rather than companies or franchises with multiple branches). There may be many thousands of such individual businesses with which a supplier has to conclude supply arrangements. This situation can make the application of short term discounts on particular products and oversight of sale of these products at the discount prohibitively complex for the supplier. The concept described herein provides a solution to this problem by allowing a supplier to offer a product discount directly to consumers, but requiring the physical involvement of the pharmacy. In particular, the two factor authentication process whereby the second unique code is available only at the pharmacy location and is revealed to the consumer only when the token on the user device has been reserved, greatly improves the ability of the supplier to monitor discounted products sales. The concept also does not require the pharmacy to change their own stock monitoring systems or to communicate electronically with either consumers or the supplier during transactions.

FIGS. 7a-e illustrate exemplary screenshots from the display 212 the user device 200 when executing an application for obtaining predicaments from the pharmacy at a discounted price.

Figure 7A:
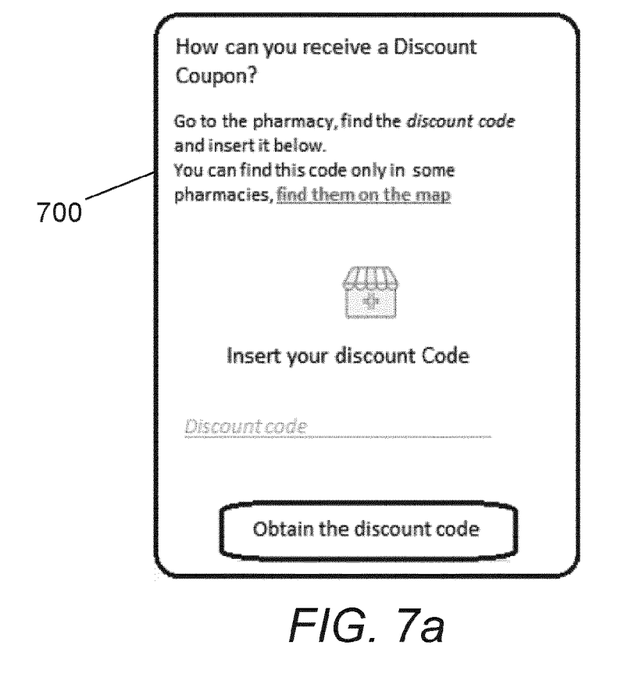
FIGS. 7a-e show exemplary screenshots from the display of the user device of FIG. 3.

FIG. 7a shows a first screenshot 700 which is displayed initially when the application is run. The first screenshot 700 informs the user of how a discount code can be obtained, and provides a box for entry of the discount code. The first screenshot 700 may inform the user that a discount code is on display at pharmacies and should be entered into the box provided. Although not shown, the first screenshot 700 may also display a soft button for activating the camera 210 the user device for capturing an image of the discount code. At the bottom of the first screenshot 700 is a soft button which the user may press after entering the code in order to begin the validation process. When the user presses this soft button, the application generates the token (also referred to herein as a coupon).

Figure 7B:
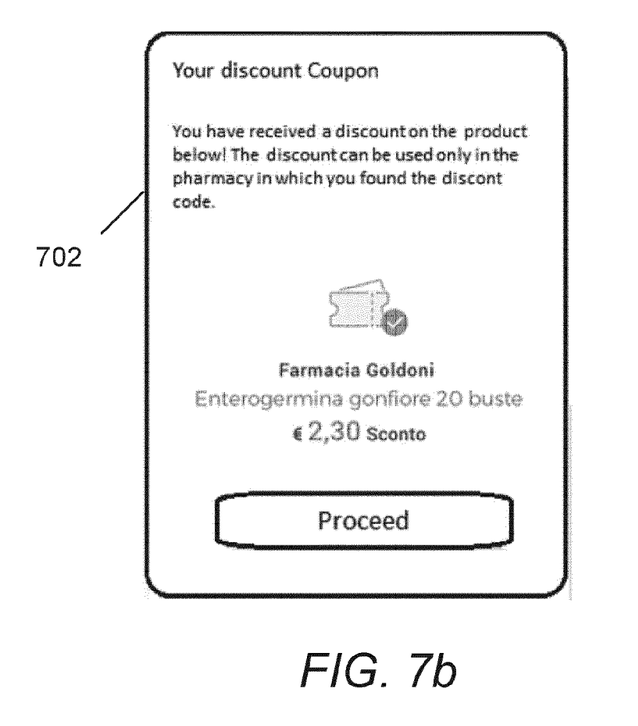

FIG. 7b shows a second screenshot 702 which is displayed after the user device 200 receives the reservation message from the communications server 100 and causes the token/coupon to be reserved. The second screenshot 702 may confirm the product and the discount which have been reserved, in this instance "enterogermina gonfiore" with a discount of €2.30. The second screenshot may also inform the user that the coupon can be used only in a particular location, this instance "Farmacia Goldoni". The second screenshot 702 also has a soft button, marked "proceed", which can be selected by the user to display a third screenshot 704.

Figure 7C:
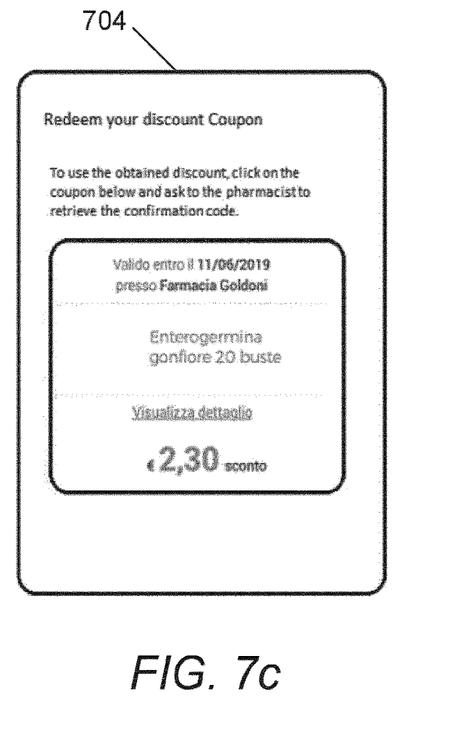

FIG. 7c shows the third screenshot 704 displaying the reserved token/coupon. The third screenshot 704 confirms the pharmacy location which the coupon is valid, the product, the product discount and an expiry date of the token/coupon. The third screenshot 704 may also display instructions to show the screen to the pharmacist in order to retrieve the second unique code (also referred to herein as the confirmation code).

Figure 7D:
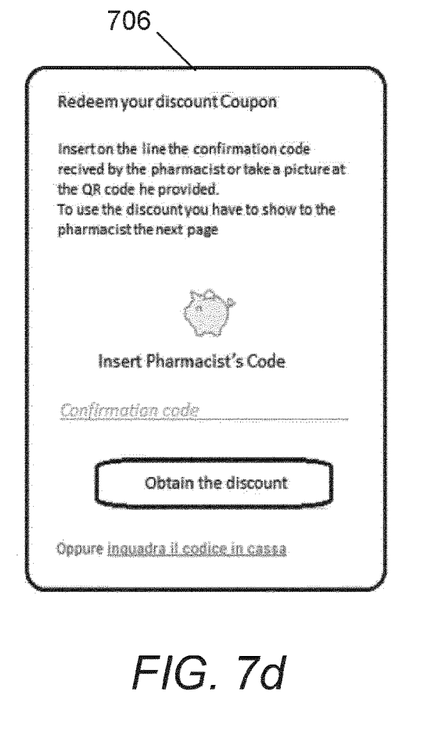

FIG. 7d shows a fourth screenshot 706 containing a box for entry of the confirmation code. Although not shown, the fourth screenshot 706 may also display a soft button for activating the camera 210 the user device for capturing an image of the confirmation code. At the bottom of the fourth screenshot 706 is a soft button which the user may press after entering the confirmation code in order to complete the validation process. The fourth screenshot 706 may also remind the user to show the subsequent page to the pharmacist.

Figure 7E:
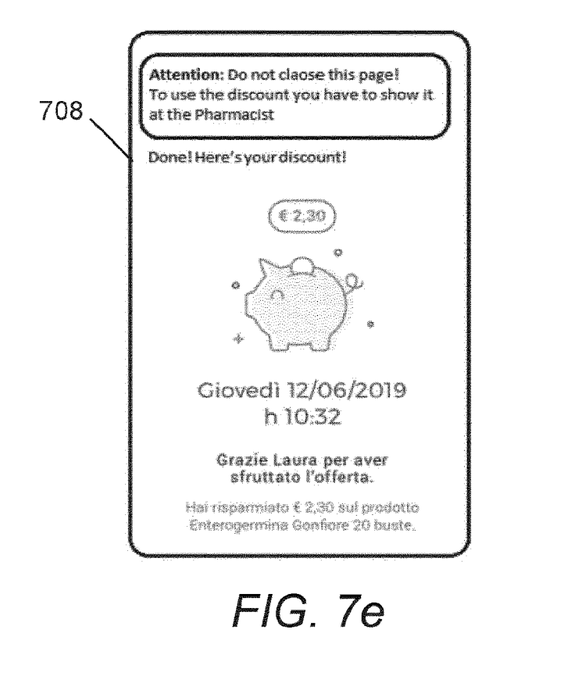

When the user presses the soft button at the bottom of screenshot 706, device 200 displays fifth screenshot 708, as shown in FIG. 7e. The fifth screenshot 708 informs the user that they must show the screen to the pharmacist to obtain the discounted product. The application running on the user device 200 may also set a time limit for use of the validated coupon. This time limit may for example be set at 10 minutes. The fifth screenshot 708 may inform the user of this time limit and optionally provide a countdown.

The invention claimed is:

1. A communications server for validating a token on a user device,
the communications server comprising:
a memory storing:
a list of locations;
a first unique code associated with each location in the list of locations;
a second unique code associated with each location in the list of locations;
a user device product threshold; and
a number of previously validated tokens for the user device,
wherein the communications server is configured to:
receive a first communication from the user device, the first communication specifying the first unique code associated with a particular location;
compare the number of previously validated tokens for the user device against the user device product threshold;
when the number of previously validated tokens for the user device does not exceed the user device product threshold, send a reservation message to the user device, the reservation message causing the token on the user device to be reserved for use at the particular location, wherein the token was previously generated by the user device and is already stored on the user device when the reservation message is received;
receive a second communication from the user device, the second communication specifying the second unique code associated with the particular location; and
in response to receiving the second unique code associated with the particular location, send a validation message to the user device, the validation message causing the token on the user device to be validated.

2. The communications server according to claim 1, wherein the memory further stores an expiry date and wherein the communications server is configured to:
compare a current date against the expiry date; and
send the reservation message to the user device only when the current date is not later than the expiry date.

3. The communications server according to claim 1, wherein the memory further stores a location product threshold and a number of previously validated tokens for each location in the list of locations and wherein the communications server is configured to:
compare a number of previously validated tokens for the particular location against the location product threshold; and
send the reservation message to the user device only when the number of previously validated tokens for the particular location does not exceed the location product threshold.

4. The communications server according to claim 3, wherein the communications server is further configured, when the number of previously validated tokens for the particular location exceeds the location product threshold, to send a rejection message to the user device, the rejection message causing the user device to indicate that the maximum number of tokens for the particular location have been validated.

5. The communications server according to claim 1, wherein the communications server is further configured, when the number of previously validated tokens for the user device exceeds the user device product threshold, to send a rejection message to the user device, the rejection message causing the user device to indicate that the maximum number of tokens for the user device have been validated.

6. The communications server according to claim 3, wherein the memory further stores a user device product per location product threshold and a number of previously validated tokens for the user device per location and wherein the communications server is configured to:
  compare a number of previously validated tokens for the user device per location against the user device product per location product threshold; and
  send the reservation message to the user device only when the number of previously validated tokens for the user device per location does not exceed the user device product per location product threshold.

7. The communications server according to claim 1, wherein the first communication from the user device or the second communication from the user device also specifies a discount applicable to the product.

8. The communications server according to claim 1, wherein the memory further stores a number of tokens for the user device which have been reserved, but not yet validated.

9. The communications server according to claim 8, wherein the communications server is configured to send the reservation message to the user device when the number of previously validated tokens for the user device plus the number of tokens for the user device which have been reserved, but not yet validated, does not exceed the user device product threshold.

10. The communications server according to claim 1, wherein the communications server is further configured, in response to sending the validation message to the user device, to send an email to an address associated with the particular location, the email confirming that a token has been validated.

11. The communications server according to claim 1, wherein the first communication from the user device also specifies a product code.

12. The communications server according to claim 1, wherein the communications server is configured to access a database and map the first unique code to a particular product using information in the database.

13. A method for validating a token on a user device, the method performed by a communications server comprising a memory storing:
  a list of locations;
  a first unique code associated with each location in the list of locations;
  a second unique code associated with each location in the list of locations;
  a user device product threshold; and
  a number of previously validated tokens for the user device,
the method comprising:
  receiving a first communication from the user device, the first communication specifying the first unique code associated with a particular location and a product code;
  comparing the number of previously validated tokens for the user device against the user device product threshold;
  when the number of previously validated tokens for the user device does not exceed the user device product threshold, sending a reservation message to the user device, the reservation message causing the token on the user device to be reserved for use at the particular location, wherein the token was previously generated by the user device and is already stored on the user device when the reservation message is received;
  receiving a second communication from the user device, the second communication specifying the second unique code associated with the particular location; and
  in response to receiving the second unique code associated with the particular location, sending a validation message to the user device, the validation message causing the token on the user device to be validated.

14. A user device for creating and validating a token, the user device comprising:
  a processor;
  a memory; and
  a wireless transceiver,
wherein the user device is configured to:
  receive a first unique code associated with a particular location;
  in response to receiving the first unique code, generate the token and send a first communication comprising the first unique code to a communications server;
  receive a reservation message from the communications server;
  in response to receiving the reservation message, reserve the token for use at the particular location;
  receive a second unique code associated with a particular location;
  in response to receiving the second unique code, send a second communication comprising the second unique code to the communications server;
  receive a validation message from the communications server; and
  in response to receiving the validation message, validate the token.

15. A method for creating and validating a token, the method performed by a user device comprising:
  a processor;
  a memory; and
  a wireless transceiver,
wherein the method comprises the user device:
  receiving a first unique code associated with a particular location;
  in response to receiving the first unique code, generating the token and sending a first communication comprising the first unique code to a communications server;
  receiving a reservation message from the communications server;
  in response to receiving the reservation message, reserving the token for use at the particular location;
  receiving a second unique code associated with a particular location;
  in response to receiving the second unique code, sending a second communication comprising the second unique code to the communications server;

receiving a validation message from the communications server; and in response to receiving the validation message, validating the token.

* * * * *